(12) United States Patent
Yatake

(10) Patent No.: US 7,273,898 B2
(45) Date of Patent: Sep. 25, 2007

(54) INK JET RECORDING INK

(75) Inventor: Masahiro Yatake, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 176 days.

(21) Appl. No.: 10/714,491

(22) Filed: Nov. 14, 2003

(65) Prior Publication Data

US 2005/0075421 A1    Apr. 7, 2005

(30) Foreign Application Priority Data

Nov. 15, 2002   (JP)  ............... 2002-332224

(51) Int. Cl.
*C09D 11/02*    (2006.01)
*C08K 5/07*    (2006.01)

(52) U.S. Cl. .................. 523/160; 523/161; 523/205; 524/82; 524/83; 106/31.6; 106/31.65; 106/31.78

(58) Field of Classification Search ............... 523/160, 523/161; 106/31.78; 524/83
See application file for complete search history.

(56) References Cited

U.S. PATENT DOCUMENTS

| | | | |
|---|---|---|---|
| 6,074,467 A * | 6/2000 | Tabayashi et al. | 106/31.65 |
| 6,367,921 B1 * | 4/2002 | Kurabayashi et al. | 347/101 |
| 6,602,333 B2 * | 8/2003 | Miyabayashi | 106/31.27 |
| 6,802,893 B1 * | 10/2004 | Komatsu et al. | 106/31.6 |

FOREIGN PATENT DOCUMENTS

| | | | |
|---|---|---|---|
| EP | 606985 A1 * | 7/1994 | |
| EP | 676140 A1 * | 10/1995 | |
| JP | 11-228860 | 8/1999 | |
| JP | 2000-355665 | 12/2000 | |
| JP | 2002-256193 | 9/2002 | |
| WO | WO 00/75245 A1 * | 12/2000 | |
| WO | WO 01/44384 A1 * | 6/2001 | |

OTHER PUBLICATIONS

English Translation of JP 11-22860 Dated Aug. 24, 1999.
English Translation of JP 2000-355665 Dated Dec. 26, 2000.
English Translation of JP 2002-256193 Dated Sep. 11, 2002.

* cited by examiner

*Primary Examiner*—Vasu Jagannathan
*Assistant Examiner*—Vickey Ronesi
(74) *Attorney, Agent, or Firm*—Ladas and Parry LLP

(57) ABSTRACT

It is an object of the present invention to provide an ink jet recording ink with excellent storage stability, with which no mold or other microbes will be generated over an extended period. The ink jet recording ink of the present invention contains water and a colorant comprising a pigment encapsulated by a polymer having a carboxyl group, wherein this ink jet recording ink is characterized by containing at least methylisothiazolone and octylisothiazolone.

18 Claims, No Drawings

INK JET RECORDING INK

BACKGROUND OF THE INVENTION

1. Field of the Invention

The present invention relates to an ink jet recording ink with excellent antiseptic and antifungal properties.

2. Description of the Related Art

Ink jet recording is a method for recording text or graphics on a recording medium surface by discharging droplets of ink from a fine nozzle. Some of the ink jet recording methods that have seen practical use include a method in which an electrostrictive element is used to convert an electrical signal into a mechanical signal, ink stored in the nozzle head portion is intermittently discharged, and text or symbols are recorded on the recording medium surface, and a method in which the part of the ink stored in the nozzle head portion that is extremely close to the discharge area is rapidly heated to create bubbles and is intermittently discharged by the volumetric expansion produced by these bubbles, so that text or symbols are recorded on the recording medium surface.

The ink used in this ink jet recording must be a type that can be discharged stably over extended periods of time. Therefore, it is imperative that no bacteria, mold, or other microbes be generated. There is no particular problem with non-aqueous inks, but bacteria, mold, or other microbes are frequently found in aqueous inks. In view of this, isothiazolone-based compounds have been used as antiseptics in the past. There are many instances of using isothiazolone-based compounds in printing supports, but few cases of using them in ink jet inks. Examples of their use in ink jet inks include the use of isothiazolone or benzisothiazolone (see Japanese Laid-Open Patent Applications H11-228860 and 2000-355665, for example), and the use of alkylisothiazolones (see Japanese Laid-Open Patent Application 2002-256193, for example). However, there has been no listing of specific examples of alkylisothiazolones, nor mention of which compounding compositions would be good.

Also, particularly in the case of an aqueous ink in which a pigment ink is used, there have been instances of use polymers for the dispersion thereof, or of using macromolecular fine particles in order to improve fixing to the paper or other recording medium.

Bacteria, mold, and other such microbes therefore tend to occur more readily than with aqueous inks in which no pigment ink is used.

SUMMARY OF THE INVENTION

In view of the above, it is an object of the present invention to solve these problems by providing an ink jet recording ink containing a colorant comprising a pigment encapsulated by a polymer having a carboxyl group, and water, wherein this ink jet recording ink contains at least methylisothiazolone and octylisothiazolone, and therefore has excellent storage stability, with which no bacteria, mold, or other microbes will be generated over an extended period.

DESCRIPTION OF THE PREFERRED EMBODIMENTS

The ink jet recording ink of the present invention contains a colorant comprising a pigment encapsulated by a polymer having a carboxyl group, and water, wherein this ink jet recording ink is characterized by containing at least methylisothiazolone and octylisothiazolone.

Diligent investigation was conducted in light of the need for antiseptic and antifungal properties in ink jet recording inks that contain water and a colorant comprising a pigment encapsulated by a polymer, and as a result it was learned that methylisothiazolone primarily provides an antiseptic effect, while octylisothiazolone primarily provides an antifungal effect, and that using both of these together provides an adequate antiseptic and antifungal effect.

It is preferable if the ink jet recording ink further contains macromolecular fine particles and a humectant, the combined amount of the polymer and the macromolecular fine particles is at least 1%, and the humectant content is at least 5%.

The fixability of the ink can be improved by setting the amount of the macromolecular fine particles and polymer contributing to dispersion to at least 1%. Also, ink clogging can be prevented by setting the amount of humectant to at least 5%.

It is preferable if the combined amount of the methylisothiazolone and the octylisothiazolone is at least 20 ppm and no more than 1000 ppm. The antiseptic and antifungal effect will be poor below 20 ppm, but even if the added amount is over 1000 ppm, there will be no further improvement in the antiseptic and antifungal effect of the ink jet ink, and with a pigment ink there is the possibility that this will result in inferior dispersion stability. A preferable range is at least 30 ppm and no more than 500 ppm, and at least 40 ppm and no more than 400 ppm is even better.

It is preferable if the methylisothiazolone content is at least 10 ppm and no more than 500 ppm, and the octylisothiazolone content is at least 10 ppm and no more than 800 ppm. It is preferable if the pH of the ink jet recording ink is from 6 to 10 when the above-mentioned alkylisothiazolone is used.

The methylisothiazolone mainly has an antiseptic action. The effect will be minimal if the content is less than 10 ppm, but even if the added amount is over 500 ppm, there will be no further improvement in the antiseptic effect. A preferable range is at least 20 ppm and no more than 400 ppm, and at least 30 ppm and no more than 300 ppm is even better.

The octylisothiazolone mainly has an antifungal action. The effect will be minimal if the content is less than 10 ppm, but even if the added amount is over 800 ppm, there will be no further improvement in the antiseptic effect of the ink jet recording ink, and with a pigment ink there is the possibility that this will result in inferior dispersion stability. A preferable range is at least 20 ppm and no more than 400 ppm, and at least 30 ppm and no more than 300 ppm is even better.

If the pH is less than 6, when an ink in which a pigment is used is dispersed in water by a carboxylic acid resulting from carboxyl groups, the acidity thereof will result in unstable dispersion. If the pH is over 10, however, this will diminish the antiseptic and antifungal effect of the methylisothiazolone and octylisothiazolone, requiring them to be added in larger amounts, and this may have an adverse effect on the dispersion stability of the pigment.

It is preferable if the ink jet recording ink further contains a polyhydric alcohol and a being capable of lowering the dynamic surface tension of the ink to 40 mN/m or less as measured by the maximum bubble pressure method at the condition of 5 Hz or higher. Lowering to 40 mN/m or less the dynamic surface tension at 5 Hz or higher as measured by maximum bubble pressure method enhances print quality.

It is preferable if the being capable of lowering the dynamic surface tension of the ink to 40 mN/m or less as measured by the maximum bubble pressure method at the condition of 5 Hz or higher is one or more types of substance selected from the group consisting of at least acetylene glycol-based surfactants, acetylene alcohol-based surfactants, silicon-based surfaxtants, glycol ethers, and/or 1,2-alkylene glycols.

It is preferable for the, acetylene glycol-based surfactant and acetylene alcohol-based surfactant to be 2,4-dimethyl-5-hexyn-3-ol, 2,4,7,9-tetramethyl-5-decyn4,7-diol, 3,6-dimethyl-4-octyn-3,6-diol, and/or the compound of adding an average of 30 or fewer ethyleneoxy groups and/or propyleneoxy groups to said 2,4-dimethyl-5-hexyn-3-ol, 2,4,7,9-tetramethyl-5-decyn-4,7-diol, and 3,6-dimethyl-4-octyn-3,6-diol. Using one of the above surfactants enhances print quality.

It is preferable for the above-mentioned glycol ether to be a diethylene glycol mono($C_4$ to $C_8$ alkyl)ether, a triethylene glycol mono($C_4$ to $C_8$ alkyl)ether, a propylene glycol mono($C_3$ to $C_6$ alkyl)ether, or a dipropylene glycol mono($C_3$ to $C_6$ alkyl)ether, or a mixture of two or more of these. There will be no increase in print quality if the number of carbons in the above-mentioned glycol ethers is below the given range, but if the number of carbons is above the given range, solubility in water will decrease and there will be no improvement in print quality.

It is preferable for the above-mentioned 1,2-alkylene glycol to be a 1,2-($C_4$-$C_{10}$ alkyl)diol. The 1,2-alkylene glycol effectively lowers the dynamic surface tension to 40 mN/m or less at 5 Hz or higher as measured by maximum bubble pressure method. However, the carbon number must be at least 4 for this effect to be achieved. If the carbon number is over 10, though, solubility in water will decrease and there will be no improvement in print quality. Even more preferably, the carbon number is 5 to 8, with a carbon number of 6 being best.

It is also preferable for 2-pyrrolidone to be further added. Using 2-pyrrolidone stabilizes the discharge of the ink from the ink jet head.

It is preferable for a polyhydric alcohol to be further added. Using a polyhydric alcohol allows clogs to be eliminated from the ink jet head faster. This polyhydric alcohol can be glycerol, trimethylolethane, trimethylolpropane, or di-, tri-, tetra-, or polyethylene glycol, or a combination thereof. These are particularly effective at eliminating clogs.

It is preferable for a chelating agent to be further added. Favorable chelating agents include ethylenediamine tetraacetic acid (EDTA) and salts thereof, nitrilotriacetic acid (NTA) and salts thereof, methylgylcinediacetic acid (MGDA) and salts thereof, L-glutaminediacetic acid (GLDA) and salts thereof, L-aspartic acid diacetate (ASDA) and salts thereof, diethylenetriaminepentaacetic acid (DTPA) and salts thereof, gluconic acid (GA) and salts thereof, citric acid (CA) and salts thereof, nitrilotripropionic acid (NTP) and salts thereof, nitrilotrisphosphonic acid (NTPO) and salts thereof, dihydroxyethylglycine (DHEG) and salts thereof, hydroxyethyliminodiacetic acid (HIDA) and salts thereof, 1,3-diamino-2-hydroxypropanetetraacetic acid (DPTA-OH) and salts thereof, hydroxyethylidenediphosphonic acid (HEDP) and salts thereof, nitrilotrimethylenephosphonic acid (NTMP) and salts thereof, and phosphonobutanetricarboxylic acid (PBTC) and salts thereof, as well as combinations of two or more of these.

It is preferable for an antiseptic to be further added. In addition to the above-mentioned methylisothiazolone and octylisothiazolone, other types of antiseptics can be used at the same time. Examples include other alkylisothiazolones, chloroalkylisothiazolones, benzisothiazolones, bromonitroalcohols, oxazolidine compounds, and chloroxylenol, which may be used singly or in combinations of two or more types.

It is preferable for a rust inhibitor to be further added. A rust inhibitor is effective when metal members are used for the ink channels or the ink jet head, and dicyclohexylammonium nitrate and/or benzotriazole is preferred.

It is also preferable for the above-mentioned colorant to be an organic pigment or an inorganic pigment. Examples when used for a black ink include furnace black, lamp black, acetylene black, channel black, and other such carbon blacks (C.I. Pigment Black 7), and copper oxide, iron oxide (C.I. Pigment Black 11), titanium oxide, and other such metals, and aniline black (C.I. Pigment Black 1) and other such organic pigment. For ink jet use, a carbon black is preferred because it has a relatively low specific gravity and is less apt to settle in water. Examples for use in colored inks include C.I. Pigment Yellow 1, 3, 12, 13, 14, 17, 24, 34, 35, 37, 42, 53, 55, 74, 81, 83, 95, 97, 98, 100, 101, 104, 108, 109, 110, 117, 120, 138, and 153, C.I. Pigment Red 1, 2, 3, 5, 17, 22, 23, 31, 38, 48:2, 48:3, 48:4, 49:1, 52:2, 53:1, 57:1, 60:1, 63:1, 63:2, 64:1, 81, 83, 88, 101, 104, 105, 106, 108, 112, 114, 122, 123, 146, 149, 166, 168, 170, 172, 177, 178, 179, 185, 190, 193, 209, and 219, C.I. Pigment Blue 1, 2, 15, 15:1, 15:2, 15:3, 15:4, 15:6, 16, 17:1, 56, 60, and 63, and C.I. Pigment Green 1, 4, 7, 8, 10, 17, 18, and 36.

In addition to ultrasonic dispersion, the dispersion method can be one involving the use of a bead mill, sand mill, roll mill, jet mill, nanomizer, or the like, or any other such dispersion method. From the standpoint of reducing contaminants for use in an ink jet ink, however, non-media dispersion using a jet mill, nanomizer, or the like is preferred.

The particle size of the pigment is preferable 25 μm or less, and a pigment composed of particles no larger than 1 μm is even better. A pigment composed of particles between 0.01 and 15 μm in size is especially favorable.

In ink jet recording, there is usually a high probability that the ink will dry on the front of the head and cause clogging, so it is preferable to add a polyhydric alcohol as a humectant in order to prevent this. Bacteria, mold, and other such microbes tend to flourish when these polyhydric alcohols are added in a large quantity, but are kept in check by the use of methylisothiazolone and octylisothiazolone. Examples of such humectants include ethylene glycol, diethylene glycol, triethylene glycol, propylene glycol, dipropylene glycol, tripropylene glycol, polyethylene glycol with a molecular weight of 2000 or less, 1,3-propylene glycol, isopropylene glycol, isobutylene glycol, 1,4-butanediol, 1,3-butanediol, 1,5-pentanediol, 1,6-hexanediol, glycerol, mesoerythritol, and pentaerythritol.

Clogging resistance can be further improved by adding a sugar in addition to the polyhydric alcohol. Bacteria, mold, and other such microbes tend to flourish when a sugar is added in a large quantity, but are kept in check by the use of methylisothiazolone and octylisothiazolone. Examples of sugars include monosaccharides, oligosaccharides, polysaccharides, and glycosides, which may in the form of an aldehyde, a ketone, or a sugar alcohol. Specific examples include erythrose, threose, erythrulose, erythritol, arabinose, xylose, ribulose, xylylose, xylytol, glucose, mannose, galactose, talose, fructose, psicose, tagatose, sorbose, sorbitol, mannitol, trehalose, kojibiose, nigrose, maltose, isomaltose, isotrehalose, sophorose, laminaribiose, cellobiose, gentibiose, maltodextrine, linear oligosaccharides, isomalto-oligosaccharides, isomerized sugar, gentioligosaccharides, polydextrose, maltitol, fructo-oligosaccharides, paratinose, paratinose-oligosaccharides, emulsified oligosaccharides, lactitol, lactulose, lactosucrose, galacto-oligosaccharides, soybean-oligosaccharides, xylo-oligosaccharides, chitin/chitosan-oligosaccharides, pectin-oligosaccharides, agaro-oligosaccharides, inulo-oligosaccharides, palatinitol, reduced syrup, carrageenan, alginic acid, pullulan, xanthan gum, gellan gum, curdlan, and polydextrose. Of these saccharides, monosaccharides and disaccharides, which have a relatively low molecular weight, are preferable in terms of improving clog resistance because saccharides with a high molecular weight raise the viscosity and therefore cannot be added in as large an amount.

The colorant comprising a pigment encapsulated in a polymer is usually added in an amount of from 0.5 to 15%. The print density will be inadequate if the amount is under 0.5%, but exceeding 15% will have no further effect in terms of color density, and will adversely affect discharge stability, which tends to result in inconsistent printing.

It is preferable for the colorant comprising a pigment encapsulated in a polymer to be produced by enveloping the pigment with a copolymer of at least a dispersant having polymerizable groups and a monomer that can be copolymerized therewith, or by phase inversion emulsification.

The "dispersant having polymerizable groups" here has at least a hydrophobic group, a hydrophilic group, and a polymerizable group. Polymerizable groups include an acryloyl group, methacryloyl group, allyl group, and vinyl group, while copolymerizable groups also include an acryloyl group, methacryloyl group, allyl group, and vinyl group.

The substance used for the polymer used to produce a colorant comprising a pigment encapsulated in a polymer can be an oligomer or monomer having an allyl group, vinyl group, acryloyl group, or methacryloyl group having a double bond. Examples include styrene, tetrahydrofurfuryl acrylate, butyl methacrylate, (α, 2, 3, or 4)-alkylstyrene, (α, 2, 3, or 4)-alkoxystyrene, 3,4-dimethylstyrene, α-phenylstyrene, divinylbenzene, vinylnaphthalene, dimethylamino (meth)acrylate, dimethylaminoethyl (meth)acrylate, dimethylaminopropylacrylamide, N,N-dimethylaminoethyl acrylate, acryloylmorpholine, N,N-dimethyl acrylamide, N-isopropylacrylamide, N,N-diethylacrylamide, methyl (meth)acrylate, ethyl (meth)acrylate, propyl (meth)acrylate, ethylhexyl (meth)acrylate, and other alkyl (meth)acrylates, methoxydiethylene glycol (meth)acrylate, ethoxy-, propoxy-, or butoxydiethylene glycol or polyethylene glycol (meth)acrylates, cyclohexyl (meth)acrylate, benzyl (meth)acrylate, phenoxyethyl (meth)acrylate, isobornyl (meth)acrylate, hydroxyalkyl (meth)acrylates, and fluorine-, chlorine-, or silicon-containing (meth)acrylates, (meth)acrylamide, maleic acid amide, (meth)acrylic acid, lauryl (meth)acrylate, urethane (meth)acrylate, and other such monofunctional compounds. When a crosslinked structure is to be introduced, compounds that can be used include (meth)acrylates of (mono-, di-, tri-, tetra- or poly-)ethylene glycol di(meth)acrylates, 1,4-butanediol, 1,5-pentanediol, 1,6-hexanediol, 1,8-octanediol, and 1,10-decanediol, trimethylolpropane tri(meth)acrylate, glycerol (di- or tri-)(meth)acrylates, di(meth)acrylates of bisphenol A or F ethylene oxide adducts, neopentyl glycol di(meth)acrylate, pentaerythritol tetra(meth)acrylate, dipentaerythritol hexa(meth)acrylate, and other such compounds having acryl or methacryl groups.

The inventors have also studied producing an ink while adding one or more compounds selected from the group consisting of polyacrylic esters, styrene-acrylic acid copolymers, polystyrenes, polyesters, polyamides, polyimides, silicon-containing polymers, and sulfur-containing polymers so that this compound is the main component.

Compounds commonly used in the radical polymerization of potassium persulfate or ammonium persulfate, hydrogen peroxide, azo compounds such as azobisisobutyronitrile or azobisisovaleronitrile, or peroxides such as benzoyl peroxide, dibutyl peroxide, peracetic acid, cumene hydroperoxide, tert-butyl hydroxyperoxide, and paramenthane hydroxyperoxide can be used as a polymerization initiator here, but the use of azo compounds is favorable in a preferred embodiment of the present invention.

With emulsion polymerization, a chain transfer agent is sometimes used. Examples include tert-dodecyl mercaptan, n-dodecyl mercaptan, n-octyl mercaptan, xanthogens such as dimethylxanthogen disulfide or diisobutylxanthogen disulfide as well as dipentene, indene, 1,4-cyclohexadiene, dihydrofuran, xanthene. As discussed above, Bacteria, mold, and other such microbes tend to flourish if the polymer used to envelop the pigment is used in a large amount, so some measure must be taken in this regard.

Macromolecular fine particles are also sometimes added as an essential component in order to improve fixability. However, the proliferation of bacteria, mold, and other such microbes is generally aided by the addition of macromolecular fine particles, so some measure must be taken against this as well. In view of this, it is effective to use an ink composition containing methylisothiazolone and octylisothiazolone as in the present invention.

The amount in which the polymer is added will be dictated by the amount in which the macromolecular fine particles (discussed below) are added, but is usually at least 0.1% and no more than 10%. A preferable range is at least 1% and no more than 8%, and at least 2% and no more than 6% is even better. The improvement in abrasion resistance will be minimal below 0.1%, but if 10% is exceeded, the viscosity of the ink will rise and make it more difficult to use as an ink jet recording ink.

Macromolecular fine particles usually form an emulsion when dispersed in water. Examples of substances that can be used to form macromolecular fine particles include styrene, tetrahydrofurfuryl acrylate, butyl methacrylate, (α, 2, 3, or 4)-alkylstyrene, (α, 2, 3, or 4)-alkoxystyrene, 3,4-dimethylstyrene, α-phenylstyrene, divinylbenzene, vinyinaphthalene, dimethylamino (meth)acrylate, dimethylaminoethyl (meth)acrylate, dimethylaminopropylacrylamide, N,N-dimethylaminoethyl acrylate, acryloylmorpholine, N,N-dimethyl acrylamide, N-isopropylacrylamide, N,N-diethylacrylamide, methyl (meth)acrylate, ethyl (meth)acrylate, propyl (meth)acrylate, ethylhexyl (meth)acrylate, and other alkyl (meth)acrylates, methoxydiethylene glycol (meth)acrylate, ethoxy-, propoxy-, or butoxydiethylene glycol or polyethylene glycol (meth)acrylates, cyclohexyl (meth)acrylate, benzyl (meth)acrylate, phenoxyethyl (meth)acrylate, isobornyl (meth)acrylate, hydroxyalkyl (meth)acrylates, and fluorine-, chlorine-, or silicon-containing (meth)acrylates, (meth)acrylamide, maleic acid amide, (meth)acrylic acid, and other such monofunctional compounds. When a crosslinked structure is to be introduced, compounds that can be used include (meth)acrylates of (mono-, di-, tri-, tetra- or poly-)ethylene glycol di(meth)acrylates, 1,4-butanediol, 1,5-pentanediol, 1,6-hexanediol, 1,8-octanediol, and 1,10-decanediol, trimethylolpropane tri(meth)acrylate, glycerol (di- or tri-)(meth)acrylates, di(meth)acrylates of bisphenol A or F ethylene oxide adducts, neopentyl glycol di(meth)acrylate, pentaerythritol tetra(meth)acrylate, and dipentaerythritol hexa(meth)acrylate.

An emulsifier can be used to form these macromolecular fine particles, such as sodium lauryl sulfate or potassium lauryl sulfate, or an anionic surfactant, nonionic surfactant, or amphoteric surfactant. Any surfactant that can be added to the above-mentioned ink can be used. Compounds that can be used as a polymerization initiator include, in addition to potassium persulfate and ammonium persulfate, hydrogen peroxide, azobisisobutyronitrile, benzoyl peroxide, dibutyl peroxide, peracetic acid, cumene hydroperoxide, tert-butyl hydroxyperoxide, and paramenthane hydroxyperoxide. Compounds that can be used as a chain transfer agent for polymerization include tert-dodecyl mercaptan, n-dodecyl mercaptan, n-octyl mercaptan, xanthogens such as dimethylxanthogen disulfide or diisobutylxanthogen disulfide, as well as dipentene, indene, 1,4-cyclohexadiene, dihydrofuran, and xanthene.

The amount in which the macromolecular fine particles are added will be dictated by the amount in which the above-mentioned polymer is added, but is usually between 0% and no more than 15%. A preferable range is at least 0.1% and no more than 10%, and at least 0.5% and no more than 5% is even better.

EXAMPLES

Specific embodiments of the present invention will now be described.

We will now discuss a case in which an organic or inorganic pigment is used as the present invention of the present invention. In the examples and comparative examples, pigment 1 was a carbon black pigment, pigment 2 a phthalocyanine pigment, pigment 3 a dimethylquinacridone pigment, and pigment 4 a diketopyrrolopyrrole pigment.

Preparation of Dispersions 1 to 4

First, Monarch 880 (a carbon black made by Cabot) was used for dispersion 1. A reaction vessel equipped with a stirrer, a thermometer, a reflux tube, and a dropping funnel was replaced with nitrogen, after which 20 parts styrene, 5 parts 2-ethylhexyl methacrylate, 15 parts butyl methacrylate, 10 parts lauryl methacrylate, 5 parts urethane acrylate oligomer (CN-972, made by Nippon Kayaku), 2 parts acrylic acid, and 0.3 part tert-dodecyl mercaptan were put into this reactor and heated to 70° C. Separately, 150 parts styrene, 15 parts acrylic acid, 50 parts butyl methacrylate, 1 part tert-dodecyl mercaptan, 20 parts methyl ethyl ketone, and 3 parts azobisisobutyronitrile were put into the dropping funnel and dropped into the reactor over a period of 4 hours while the dispersed polymer was reacted. Methyl ethyl ketone was then added to the reactor to prepare a dispersed polymer solution with a 40% concentration.

40 parts of the above-mentioned dispersed polymer solution was mixed with 30 parts Monarch 880 (a carbon black made by Cabot), 100 parts of a 0.1 mol/L sodium hydroxide aqueous solution, and 30 parts methyl ethyl ketone, and this mixture was stirred for 30 minutes in a homogenizer. After this, 300 parts ion exchange water was added, and the system was stirred for another hour. A rotary evaporator was then used to distill off part of the water and all of the methyl ethyl ketone, the system was neutralized with 0.1 mol/L sodium hydroxide to adjust the pH to 9, and then this product was filtered with an 0.3 μm membrane filter to produce a dispersion 1 with a solids content (dispersed polymer and carbon black) of 20%.

Dispersions 2 to 4 were obtained by the same procedure as above. Pigment Blue 15:3 (a copper phthalocyanine pigment made by Clariant) was used for dispersion 2, Pigment Red 122 (a dimethylquinacridone pigment made by Clariant) was used for dispersion 3, and Pigment Yellow 180 (a diketopyrrolopyrrole pigment made by Clariant) was used for dispersion 4.

Preparation of Macromolecular Fine Particles 100 parts ion exchange water was put into a reaction vessel equipped with a dropping apparatus, a thermometer, a water-cooled reflux condenser, and a stirrer, and 0.2 part potassium persulfate (a polymerization initiator) was added while the system was stirred under a nitrogen atmosphere at 70° C. A monomer solution of 0.05 part sodium lauryl sulfate, 4 parts glycidoxy acrylate, 5 parts styrene, 6 parts tetrahydrofurfuryl acrylate, 15 parts urethane acrylate oligomer (CN-972, made by Nippon Kayaku), 5 parts butyl methacrylate, and 0.02 part tert-dodecyl mercaptan in 7 parts ion exchange water was added dropwise to the system at 70° C. and reacted to produce for a primary substance 1. 2 parts of a 10% ammonium persulfate solution was added to the primary substance 1 and stirred, after which a reaction solution composed of 30 parts ion exchange water, 0.2 part potassium lauryl sulfate, 30 parts styrene, 25 parts butyl methacrylate, 6 parts butyl acrylate, 2 parts acrylic acid, 1 part 1,6-hexanediol dimethacrylate, and 0.5 part tert-dodecyl mercaptan was added under stirring at 70° C. and a polymerization reaction was brought about, after which the system was neutralized with sodium hydroxide to adjust the pH to between 8 and 8.5, and passed through a 0.3 μm filter to produce a 30% aqueous solution of macromolecular fine particles. This was termed macromolecular fine particles aqueous solution A.

Preparation of Ink Solvent

The following mixture was termed ink aqueous solution B (ink solvent). The added amounts given below refer to the added amount based on the weight of the ink composition (100 wt %).

| Ink aqueous solution B | Added amount (wt %) |
| --- | --- |
| 1,2-hexanediol | 3.0 |
| Olefin E1010 (made by Nisshin Chemical) | 0.6 |
| 2-pyrroldone | 2.0 |
| triethylene glycol | 2.0 |
| trimethylolpropane | 8.0 |
| glycerol | 7.0 |
| ethylenediaminetetraacetic acid, 2Na salt | 0.02 |
| benzotriazole | 0.01 |
| methylisothiazolone | 0.01 |
| octylisothiazolone | 0.02 |
| ion exchange water | 17.34 |

Production of Ink Jet Recording Ink

The numbers in parentheses are the average particle size in nm (nanometer) units.

Example 1

| | Added amount (wt %) |
| --- | --- |
| dispersion 1 (105) | 37.5 |
| macromolecular fine particles aqueous solution A | 14.0 |
| ink aqueous solution B | 40.0 |
| triethanolamine | 0.8 |
| ion exchange water | balance |

Example 2

|  | Added amount (wt %) |
|---|---|
| dispersion 2 (85) | 22.5 |
| macromolecular fine particles aqueous solution A | 5.0 |
| ink aqueous solution B | 40.0 |
| ion exchange water | balance |

Example 3

|  | Added amount (wt %) |
|---|---|
| dispersion 3 (90) | 27.5 |
| macromolecular fine particles aqueous solution A | 5.0 |
| ink aqueous solution B | 40.0 |
| ion exchange water | balance |

Example 4

|  | Added amount (wt %) |
|---|---|
| dispersion 4 (80) | 25.0 |
| macromolecular fine particles aqueous solution A | 4.0 |
| ink aqueous solution B | 40.0 |
| ion exchange water | balance |

Example 5

|  | Added amount (wt %) |
|---|---|
| dispersion 1 (105) | 15.0 |
| macromolecular fine particles aqueous solution A | 15.0 |
| ink aqueous solution B | 40.0 |
| triethanolamine | 0.9 |
| ion exchange water | balance |

Example 6

|  | Added amount (wt %) |
|---|---|
| dispersion 2 (85) | 25.0 |
| macromolecular fine particles aqueous solution A | 5.0 |
| ink aqueous solution B | 40.0 |
| ion exchange water | balance |

Example 7

|  | Added amount (wt %) |
|---|---|
| dispersion 3 (90) | 25.0 |
| macromolecular fine particles aqueous solution A | 5.0 |
| ink aqueous solution B | 40.0 |
| ion exchange water | balance |

Example 8

|  | Added amount (wt %) |
|---|---|
| dispersion 4 (80) | 27.5 |
| macromolecular fine particles aqueous solution A | 5.0 |
| ink aqueous solution B | 40.0 |
| ion exchange water | balance |

Evaluation of Discharge Stability and Antiseptic and Antifungal Properties

Table 1 shows the results of evaluating storage stability and discharge stability using the inks of Examples 1 to 8 and inks that were the same as these, but did not contain methylisothiazolone (MIT) and octylisothiazolone (OIT). Storage stability was evaluated as follows. The cartridge of an EM-930C ink jet printer made by Seiko-Epson was filled with each of the inks of Examples 1 to 8 and then left for six months at 30° C. To check for the proliferation of bacteria, mold, or other microbes, 1 g of ink was sampled and cultured for 4 weeks in an agar medium at 25° C. and 30° C., and the sample was checked for an increase in bacteria or mold. The rating was A if the bacteria or mold count was 100 or less, B if the count was 101 to 1000, and C if the count was 1001 or higher. Discharge stability was evaluated as follows. The cartridge of an EM-930C ink jet printer made by Seiko-Epson was filled with each of the inks and left for 3 months at 40° C. and 20% relative humidity, and then the print was examined for distortion or the like. 5000 characters were printed on an ordinary sheet of A4-size paper, and the rating was A if there was no print distortion in 10 or more pages, B if there was print distortion at 1 to 5 places within 10 pages, and C if there was print distortion at 6 or more places within 10 pages. In both evaluations, a rating of A was considered a practical level, B was considered practical, but with some problems, and C was considered an impractical level.

TABLE 1

Storage stability and discharge stability evaluation results

|  |  | Example number |  |  |  |  |  |  |  |
|---|---|---|---|---|---|---|---|---|---|
|  |  | 1 | 2 | 3 | 4 | 5 | 6 | 7 | 8 |
| Example | storage stability | A | A | A | A | A | A | A | A |
|  | discharge stability | A | A | A | A | A | A | A | A |
| no MIT | storage stability | C | C | C | C | B | C | C | C |
|  | discharge stability | C | C | C | C | C | C | C | C |
| no OIT | storage stability | B | B | C | C | B | B | C | C |
|  | discharge stability | B | C | C | C | B | C | C | C |

As can be seen from the results in Table 1, the antiseptic and antifungal effect is good and discharge stability is ensured with an ink jet recording ink containing at least water and a colorant comprising a pigment encapsulated by a polymer.

As discussed above, the present invention provides a highly-practical ink jet recording ink with excellent antiseptic and antifungal properties and discharge stability.

Fixability and Clog Elimination Test

Table 2 shows the results of testing for antiseptic and antifungal properties, fixability, and clog elimination when using a so-called self-dispersing pigment (hereinafter referred to simply as "surface treated pigment") which was rendered dispersible and/or soluble in water without a dispersant by chemically introducing groups that impart direct dispersibility to the pigment particle surface, without using any dispersed polymer, when the humectants (triethylene glycol, trimethylolpropane, and glycerol) were removed from the inks in Examples 1 to 8. The antiseptic and antifungal properties were evaluated by the same test as in Table 1. Fixability was evaluated as follows. Ink jet paper (PM photographic paper) made by Seiko-Epson was printed, a fluorescent pen (Zebra Pen 2) made by Zebra was used to draw a line on the print at an angle of 60° and a pen pressure of 300 g, and the extent of print separation was evaluated. A rating of A was given if there was no separation whatsoever, B if the length of separation was less than 1 cm, C if the length of separation was 1 to 2 cm, and D if the length of separation was over 2 cm. The clog elimination test was conducted as follows. The cartridge of an EM-930C ink jet printer made by Seiko-Epson was filled with each of the inks and left for 3 months at 40° C. and 20% relative humidity, and a rating of A was given if clogs were eliminated from all nozzles after 3 or fewer cleanings (with the mechanism ordinarily provided to a printer, for restoring normal operation after a clog so that ink will again flow from the nozzles), B if clogs were eliminated from all nozzles after 4 or 5 cleanings, C if clogs were eliminated from all nozzles after 10 or fewer cleanings, and D if clogs were not eliminated from all nozzles even after 10 cleanings. In all these evaluations, a rating of A was considered a practical level, B was considered practical, but with some problems, and C and D were considered an impractical level.

TABLE 2

Results of testing antiseptic and antifungal properties, fixability, and clog elimination

| | | Example number | | | | | | | |
|---|---|---|---|---|---|---|---|---|---|
| | | 1 | 2 | 3 | 4 | 5 | 6 | 7 | 8 |
| Example | antiseptic and antifungal | A | A | A | A | A | A | A | A |
| | fixability | A | A | A | A | A | A | A | A |
| | clog elimination | A | A | A | A | A | A | A | A |
| no humectant | antiseptic and antifungal | A | A | A | A | A | A | A | A |
| | fixability | A | A | A | A | A | A | A | A |
| | clog elimination | D | D | D | D | D | D | D | D |
| | antiseptic and antifungal | A | A | A | A | A | A | A | A |
| no dispersed polymer (surface treated pigment) | antiseptic and antifungal | A | A | A | A | A | A | A | A |
| | fixability | D | D | D | D | D | D | D | D |
| | clog elimination | A | A | A | A | A | A | A | A |

As can be seen from the results in Tables 1 and 2, when at least methylisothiazolone and octylisothiazolone are used in an ink jet recording ink containing water and a colorant comprising a pigment encapsulated by a polymer having a carboxyl group, and in which the amount of this polymer and macromolecular fine particles is at least 1%, and the humectant content is at least 5%, the result is an ink jet recording ink with excellent antiseptic and antifungal properties, discharge stability, fixability, and clog elimination.

Test of Antiseptic and Antifungal Properties and Storage Stability Versus Added Amounts of Methylisothiazolone and Octylisothiazolone Table 3 shows the results of evaluating the storage stability and the antiseptic and antifungal effect of the inks in Examples 1 to 4 versus the added amounts of methylisothiazolone and octylisothiazolone. The method for evaluating the antiseptic and antifungal properties in Table 1 was broken down into an antiseptic test and an antifungal test. The antiseptic test was based on the bacteria count when the sample ink was left for 4 weeks at 25° C., while the antifungal test was based on the mold count when the sample ink was left for 4 weeks at 30° C. A rating of A was given if the bacteria or mold count was 100 or less, B if the count was 101 to 1000, and C if the count was 1001 or higher. The storage stability of the ink was evaluated as follows. The ink was placed in a sample vial, stoppered, then left for 30 days at 70° C., and the viscosity after the test was divided by the initial viscosity. A rating of A was given if the quotient was 1.0 to 1.1, B if over 1.1 but no more than 1.2, C if over 1.2 but no more than 1.5, and D if over 1.5. In all these evaluations, a rating of A was considered a practical level, B was considered practical, but with some problems, and C and D were considered an impractical level.

TABLE 3

Results of evaluating antiseptic and antifungal effect versus added amounts of methylisothiazolone (MIT) and octylisothiazolone (OIT) using the inks of Examples 1 to 4

| MIT added amount (ppm) | OIT added amount (ppm) | Antiseptic effect | | | | Antifungal effect | | | | Storage stability | | | |
|---|---|---|---|---|---|---|---|---|---|---|---|---|---|
| | | Example number | | | | | | | | | | | |
| | | 1 | 2 | 3 | 4 | 1 | 2 | 3 | 4 | 1 | 2 | 3 | 4 |
| 5 | 5 | D | D | D | D | D | D | D | D | D | D | D | D |
| 5 | 10 | C | C | C | D | B | B | B | B | D | C | C | D |
| 10 | 100 | B | B | B | B | A | A | A | A | A | A | A | A |
| 10 | 300 | A | A | A | A | A | A | A | A | A | A | A | A |
| 100 | 5 | A | A | A | A | C | C | C | D | A | A | A | A |
| 100 | 100 | A | A | A | A | A | A | A | A | A | A | A | A |
| 300 | 5 | A | A | A | A | C | C | C | C | A | A | A | A |
| 300 | 100 | A | A | A | A | A | A | A | A | A | A | A | A |
| 500 | 100 | A | A | A | A | A | A | A | A | A | A | A | A |

TABLE 3-continued

Results of evaluating antiseptic and antifungal effect versus added amounts of methylisothiazolone (MIT) and octylisothiazolone (OIT) using the inks of Examples 1 to 4

| MIT added amount (ppm) | OIT added amount (ppm) | Antiseptic effect 1 | 2 | 3 | 4 | Antifungal effect Example number 1 | 2 | 3 | 4 | Storage stability 1 | 2 | 3 | 4 |
|---|---|---|---|---|---|---|---|---|---|---|---|---|---|
| 500 | 800 | A | A | A | A | A | A | A | A | B | B | B | B |
| 800 | 200 | A | A | A | A | A | A | A | A | B | B | B | B |
| 800 | 500 | A | A | A | A | A | A | A | A | C | C | C | D |
| 1000 | 500 | A | A | A | A | A | A | A | A | D | D | D | D |
| 1000 | 800 | A | A | A | A | A | A | A | A | D | D | D | D |

As can be seen from the results in Table 3, it is effective for the combined amount of methylisothiazolone and octylisothiazolone to be at least 20 ppm and no more than 1000 ppm, for the methylisothiazolone content to be at least 10 ppm and no more than 500 ppm, and for the octylisothiazolone content to be at least 10 ppm and more than 800 ppm.

Test of Antiseptic and Antifungal Properties and Storage Stability when Using a Colorant Other than the Colorant of the Present Invention Comprising a Pigment Encapsulated by a Polymer Having a Carboxyl Group Table 4 shows the results of testing the antiseptic and antifungal effect and storage stability when using a colorant other than the colorant of the present invention comprising a pigment encapsulated by a polymer having a carboxyl group. The evaluated inks (Comparative Examples 1 and 2) had the same composition as in Example 1, except that the pigment and macromolecular fine particles were excluded. A surface treated pigment or dye was used as the colorant. The amount in which each colorant was added here was the same, CW1 (Orient Chemical) was used as the surface treated pigment, and Food Black 2 was used as the dye.

Comparative Example 1

|  | Added amount (wt %) |
|---|---|
| CW1 (Orient Chemical) | 7.5 |
| ink aqueous solution B | 40.0 |
| triethanolamine | 0.8 |
| ion exchange water | balance |

Comparative Example 2

|  | Added amount (wt %) |
|---|---|
| dye (Food Black 2) | 5.5 |
| ink aqueous solution B | 40.0 |
| triethanolamine | 0.8 |
| ion exchange water | balance |

The antiseptic test, antifungal test, and storage stability test were conducted in the same manner as in Table 3. In all these evaluations, a rating of A was considered a practical level, B was considered practical, but with some problems, and C and D were considered an impractical level.

TABLE 4

Antiseptic and antifungal effect and storage stability test results when using a colorant other than a colorant comprising a pigment encapsulated by a polymer having a carboxyl group

| MIT added (ppm) | OIT added (ppm) | Antiseptic effect Dye | Antiseptic effect S.T. | Antifungal effect Dye | Antifungal effect S.T. | Storage stability Dye | Storage stability S.T. |
|---|---|---|---|---|---|---|---|
| 5 | 5 | D | C | D | A | D | A |
| 5 | 10 | C | B | C | A | D | A |
| 10 | 100 | C | B | C | A | A | A |
| 10 | 300 | C | A | C | A | A | A |
| 100 | 5 | A | A | C | A | A | A |
| 100 | 100 | A | A | C | A | A | A |
| 300 | 5 | A | A | C | A | C | A |
| 300 | 100 | A | A | B | A | C | A |
| 500 | 100 | A | A | B | A | C | A |
| 500 | 800 | A | A | B | A | C | A |
| 800 | 200 | A | A | A | A | D | A |
| 800 | 500 | A | A | A | A | D | A |
| 1000 | 500 | A | A | A | A | D | A |
| 1000 | 800 | A | A | A | A | D | A |

[S.T.: surface treated [pigment]]

As can be seen from Tables 3 and 4, when using a colorant comprising a pigment encapsulated by a polymer having a carboxyl group as in the present invention, both methylisothiazolone and octylisothiazolone must be used. The added amounts exhibit a different trend from that in Table 3, and it can be seen that the same does not hold true for a dye or surface treated pigment.

Also, water resistance is lacking with a dye, while abrasion resistance is lacking with a surface treated pigment, so macromolecular fine particles or a colorant comprising a pigment encapsulated by a polymer are necessary if both water resistance and fixability are to be obtained, in which case it can be seen that the use of both methylisothiazolone and octylisothiazolone as antiseptic and antifungal agents is effective.

The present invention should not be construed as being limited to these examples, and various modifications are possible within the scope of the present invention.

Effect of the Invention

As discussed above, the ink jet recording ink of the present invention has excellent storage stability, with no proliferation of bacteria, mold, or other microbes over an extended period, and also has excellent storage stability and fixability.

The invention claimed is:

1. An ink jet recording ink containing water and a colorant comprising a pigment encapsulated by a polymer having a carboxyl group,
   wherein said ink jet recording ink further contains at least methylisothiazolone and octylisothiazolone, wherein the octylisothiazolone content is at least 100 ppm and no more than 800 ppm, the combined amount of methylisothiazolone and octylisothiazolone is at least 110 ppm and no more than 1300 ppm, and wherein the methylisothiazolone content is at least 10 ppm and no more than 500 ppm, and is an amount that, in consideration of the octylisothiazolone content and the combined amount of methylisothiazolone and octylisothiazolone, would result in the ink having a final viscosity after storage in a stoppered vial for 30 days at 70° C. that is at least 1.0 and no more than 1.2 times greater than viscosity of the ink before the storage.

2. The ink jet recording ink according to claim 1, wherein the ink jet recording ink further contains macromolecular fine particles and a humectant,
   the combined amount of the polymer and the macromolecular fine particles is at least 1%, and
   the humectant content is at least 5%.

3. The ink jet recording ink according to claim 1, wherein the combined amount of the methylisothiazolone and the octylisothiazolone is at least 110 ppm and no more than 1000 ppm.

4. The ink jet recording ink according to claim 1, wherein the pH of the ink jet recording ink is from 6 to 10.

5. The ink jet recording ink according to claim 1, wherein the ink jet recording ink further contains a polyhydric alcohol and a substance being capable of lowering the dynamic surface tension of the ink to 40 mN/m or less as measured by the maximum bubble pressure method at the condition of 5 Hz or higher.

6. The ink jet recording ink according to claim 5, wherein the substance being capable of lowering the dynamic surface tension of the ink to 40 mN/m or less as measured by the maximum bubble pressure method at the condition of 5 Hz or higher is at least one or more types of substance selected from the group consisting of acetylene glycol-based surfactants, acetylene alcohol-based surfactants, silicon-based surfaxtants, glycol ethers, and 1,2 alkylene glycols.

7. The ink jet recording ink according to claim 1, wherein the pigment is an organic pigment or an inorganic pigment.

8. The ink jet recording ink according to claim 2, wherein the pH of the ink jet recording ink is from 6 to 10.

9. The ink jet recording ink according to claim 3, wherein the pH of the ink jet recording ink is from 6 to 10.

10. The ink jet recording ink according to claim 2, wherein the ink jet recording ink further contains a polyhydric alcohol and a substance being capable of lowering the dynamic surface tension of the ink to 40 mN/m or less as measured by the maximum bubble pressure method at the condition of 5 Hz or higher.

11. The ink jet recording ink according to claim 3, wherein the ink jet recording ink further contains a polyhydric alcohol and a substance being capable of lowering the dynamic surface tension of the ink to 40 mN/m or less as measured by the maximum bubble pressure method at the condition of 5 Hz or higher.

12. The ink jet recording ink according to claim 10, wherein the being capable of lowering the dynamic surface tension of the ink to 40 mN/m or less as measured by the maximum bubble pressure method at the condition of 5 Hz or higher is at least one or more types of substance selected from the group consisting of acetylene glycol-based surfactants, acetylene alcohol-based surfactants, silicon-based surfaxtants, glycol ethers, and 1,2 alkylene glycols.

13. The ink jet recording ink according to claim 11, wherein the being capable of lowering the dynamic surface tension of the ink to 40 mN/m or less as measured by the maximum bubble pressure method at the condition of 5 Hz or higher is at least one or more types of substance selected from the group consisting of acetylene glycol-based surfactants, acetylene alcohol-based surfactants, silicon-based surfaxtants, glycol ethers, and 1,2 alkylene glycols.

14. The ink jet recording ink according to claim 2, wherein the pigment is an organic pigment or an inorganic pigment.

15. The ink jet recording ink according to claim 3, wherein the pigment is an organic pigment or an inorganic pigment.

16. The ink jet recording ink according to claim 1, wherein the methylisothiazolone and octylisothiazolone are present in the ink in respective amounts such that the ink has a better storage stability than the ink without the methylisothiazolone or octylisothiazolone.

17. The ink jet recording ink according to claim 1, wherein the methylisothiazolone content is an amount that, in consideration of the octylisothiazolone content and the combined amount of methylisothiazolone and octylisothiazolone, results in the ink having a final viscosity after storage in a stoppered vial for 30 days at 70° C. that is at least 1.0 and no more than 1.1 times greater than an initial viscosity of the ink before the storage.

18. A method for improving storage stability of an ink comprising water and a colorant, wherein the colorant comprises a pigment encapsulated by a polymer having a carboxyl group, the method comprising the step of incorporating into the ink methylisothiazolone and octylisothiazolone such that the octylisothiazolone content of the ink is at least 100 ppm and no more than 800 ppm, the combined amount of methylisothiazolone and octylisothiazolone is at least 110 ppm and no more than 1300 ppm, and the methylisothiazolone content is at least 10 ppm and no more than 500 ppm, and is an amount that, in consideration of the octylisothiazolone content and the combined amount of methylisothiazolone and octylisothiazolone, would result in the ink having a final viscosity after storage in a stoppered vial for 30 days at 70° C. that is at least 1.0 and no more than 1.2 times greater than an initial viscosity of the ink before the storage.

* * * * *